United States Patent [19]

Cook, Jr. et al.

[11] Patent Number: 4,475,737
[45] Date of Patent: Oct. 9, 1984

[54] SLIP SPLINE SEALING PLUG

[75] Inventors: Thomas J. Cook, Jr., Oregon; Jay W. Thorngurgh, Toledo, both of Ohio

[73] Assignee: Dana Corporation, Toledo, Ohio

[21] Appl. No.: 378,044

[22] Filed: May 14, 1982

[51] Int. Cl.³ .................. F16J 15/00; F16C 33/76
[52] U.S. Cl. .................. 277/182; 206/318; 206/335; 403/57; 403/359
[58] Field of Search ........ 403/57, 58, 359, 288; 206/318, 335; 277/182, 169

[56] References Cited

U.S. PATENT DOCUMENTS

| 1,917,988 | 7/1933 | Lange | 277/182 |
| 2,116,290 | 5/1938 | Spicer | 64/23 |
| 2,510,362 | 6/1950 | Anderson | 64/32 |
| 3,063,266 | 11/1962 | Rabson | 64/32 |
| 3,344,618 | 10/1967 | Young | 64/3 |
| 3,400,558 | 9/1968 | Haines | 64/23 |
| 3,989,259 | 11/1976 | Lorenz et al. | 277/182 |
| 4,114,898 | 9/1978 | Bainard et al. | 277/179 |

Primary Examiner—Robert I. Smith
Attorney, Agent, or Firm—Norb A. Heban

[57] ABSTRACT

A slip spline assembly includes a splined stub shaft slidably received in a splined bore of a yoke member. A sealing plug is provided at one end of the yoke bore to maintain lubricant on the splines and prevent ingress of foreign matter. A plurality of resilient fingers on the plug snap into an annular groove formed in the yoke bore to positively retain the plug. A vent opening in the plug relieves pressure in the closed end of the yoke when the splined shaft slides toward the yoke closed end.

11 Claims, 4 Drawing Figures

SLIP SPLINE SEALING PLUG

BACKGROUND OF THE INVENTION

This invention relates to couplings in general and is particularly directed to a sealing plug for use in a torque transmitting slip spline assembly.

Slip spline assemblies of the type to which the invention relates typically comprises a yoke having a splined bore for slidably receiving a splined portion of a stub shaft. In these applications it is necessary to provide lubrication between the mating sliding splines. The spline connection may be lubricated for life at assembly, or the yoke may have a lubrication fitting for periodically replenishing lubricant. Usually, the body end of the slip yoke is sealed with a plug to retain the spline lubricant. The plug may be either solid or vented. The method of sealing employed for a spline connection generally depends on its specific design as well as its application. For example, in an internally splined slip yoke used at the transmission output shaft of a vehicle, a solid plug is used at the body end and a boot type seal is provided at the hub end of the slip yoke to protect the splines from dust, dirt, and other foreign matter. In this type of application, it is common practice to remove one of the spline teeth to facilitate the back and forth flow of lubricant during stroking. In applications having a seal retained on the slip yoke hub end in direct sealing contact with the stub shaft, a vented plug is used to maintain lubricant on the splines and prevent a pressure build-up when the stub shaft slides towards the closed end of the slip yoke.

In the past, numerous methods have been disclosed for retaining sealing plugs in slip yoke bores. The plugs also have taken many shapes. The more conventional types include a Welch plug, which consists of a flat annular disc, and a cup-shaped plug. In each case, the plug is pressed into the hub end of the slip yoke bore and retained in place by welding, staking, or a suitable epoxy cement.

While plugs of the above type function satisfactorily, they require additional operations after being pressed in place for positive retention in the slip yoke bore.

SUMMARY OF THE INVENTION

The present invention is a cup-shaped sealing plug for a slip spline assembly comprising a flexible section having a radial shoulder which snaps and locks into an annular radial groove provided in the slip yoke bore when the plug is pressed in place. The locking connection achieved by the cooperating radial shoulder and groove eliminates the need for providing additional welds, staking or special bonding cement to secure the plug after it has been pressed into the slip yoke bore.

DESCRIPTION OF THE PREFERRED EMBODIMENT

Figure 1:
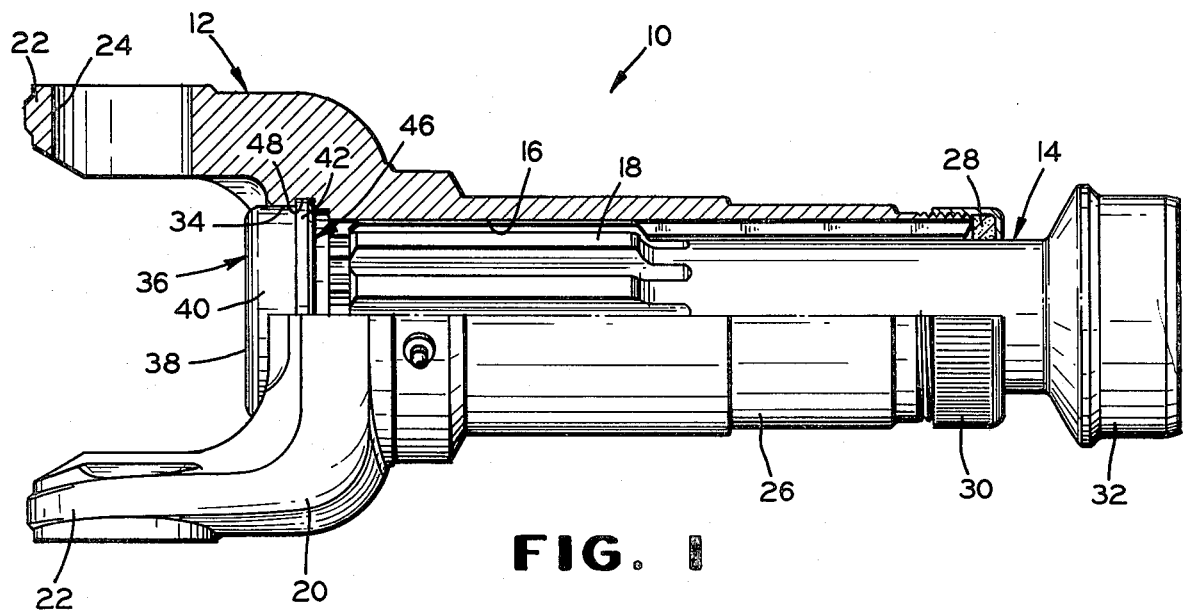
FIG. 1, is a longitudinal partial cross-sectional view of a slip spline assembly utilizing the present invention.

Referring to FIG. 1, a slip spline assembly is shown generally at 10 including a slip yoke 12 and a mating slip stub shaft 14. Slip yoke 12 has an internally splined bore 16 for sliding connection with an externally splined portion 18 on stub shaft 14. Slip yoke 12 comprises a body portion 20 at one end formed with opposed ears 22. Bearing cross holes 24 are provided in the ears 22 for mounting a journal cross (not shown) for connection to a conventional end yoke (not shown). The opposite end of slip yoke 12 comprises an axially elongated tubular hub portion 26 which surrounds the stub shaft splined portion 18. An annular seal 28 is attached by a seal retainer 30 to the outer end of hub portion 26 to slidably and sealingly engage the cylindrical surface on stub shaft 14. The outer end of stub shaft 14 comprises a pilot portion 32 for attachment to a driveline member (not shown).

In the preferred embodiment, the body end of slip yoke 12 is constructed with an annular counterbored recess 34 for receiving a cup-shaped sealing plug 36. The plug 36 retains lubricant on mating splines 16 and 18 and prevent ingress of foreign matter. Plug 36 comprises a flat end wall 38 and an integral axially inwardly extending cylindrical side wall 40. A breather or bleed opening 41 is provided in end wall 38 to prevent a pressure build-up in yoke bore 34 when stub shaft 14 slides toward the closed end of slip yoke 12.

Thus, in viewing FIG. 1, it will be seen that splined bore 16 extends completely through slip yoke 12 thereby defining first and second openings on opposite sides of splined bore 16, i.e. at the inner body end and outer hub end.

Figure 2:
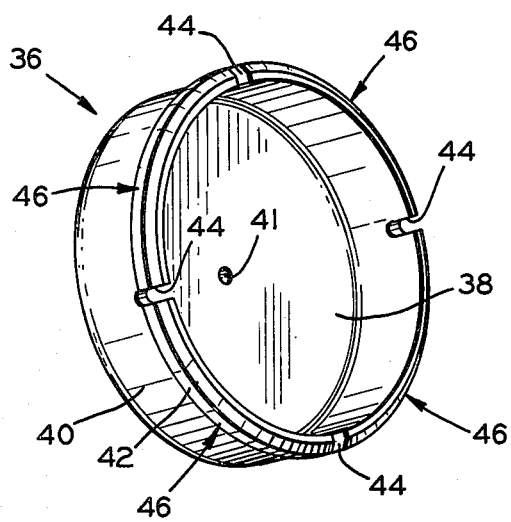
FIG. 2, is an enlarged perspective view of the sealing plug of FIG. 1.
Figure 3:
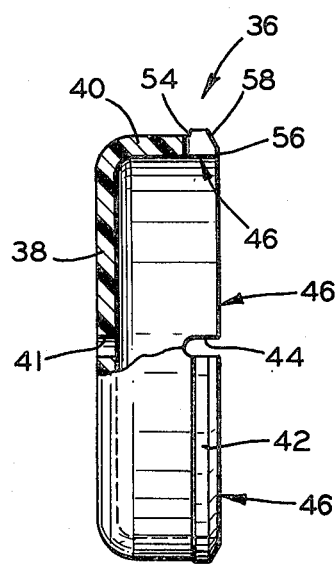
FIG. 3, is a partial cross-sectional side view of the sealing plug shown in FIG. 2.

Cooperating fastening means are provided on the open or axially inner end of plug side wall 40 and in slip yoke recessed bore 34 for securing plug 36 in place. The fastening portion on plug 36, as seen best in FIGS. 2 and 3, comprises an annular raised shoulder 42 having a plurality of equally spaced notches 44 extending axially inwardly from the end of plug side wall 40. Notches 44 serve to divide shoulder 42 and thereby the open end of the side wall 40 into a plurality of flexible portions 46. As most clearly seen in FIGS. 2 and 3, flexible portions 46 comprises equally spaced arcuately shaped axially extending tab sections.

Figure 4:
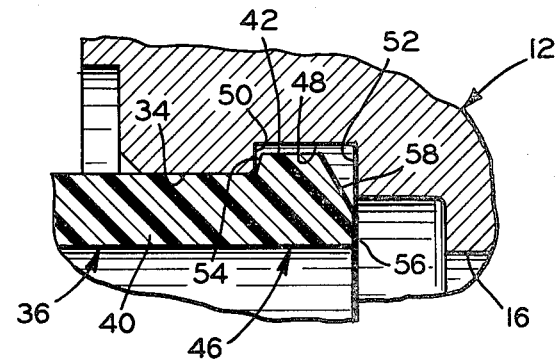
FIG. 4, is an enlarged fragmentary view showing the locking connection of the sealing plug and slip yoke of FIG. 1.

Referring to FIGS. 1 and 4, the fastening portion on slip yoke 12 comprises an annular groove 48 in recessed bore 34 for cooperating with shoulder 42 on plug flexible locking portions 46. In assembly, initial pressure applied to the outer face of plug end wall 38 by a conventional assembly tool (not shown) will result in tab sections or locking portions 46 being flexed radially inwardly as shoulder 42 initially contacts the outer edge of yoke bore 34. Further pressure applied to plug 36 forces it deeper into yoke bore 34 until shoulder 42 aligns with annular groove 48. At this point the flexibility of locking portions 46 permits shoulder 42 to snap outwardly into locking engagement with bore groove 48 thus serving to positively lock plug 36 in yoke bore 34 without requiring any additional means or operation to secure plug 36 in place.

Referring specifically to FIG. 4, it will be seen that yoke bore groove 48 defines inner and outer radial walls 50 and 52 respectively which are disposed at right angles to the groove bottom. In the preferred embodiment, for clearance purposes, plug shoulder 42 has its outer peripheral portion constructed with a diameter which is less than the inner diameter of the groove bottom and greater than the outer diameter of plug side wall 40 thereby defining inner and outer radial walls 54 and 56 respectively on shoulder 42. The axial length of shoulder 42, i.e., the distance between shoulder walls 54 and 56, is slightly less than the axial distance between groove walls 50 and 52. For assembly purposes, the radially outer edge of inner shoulder wall 56 has a chamfer 58 which serves as a camming means for flexing section 46 inwardly as plug 36 is initially pressed into yoke bore 34. The respective mating outer walls 50 and 54 in bore groove 48 and on shoulder 42 are constructed so that when sections 46 snap into place, shoulder outer wall 54 engages bore groove outer wall 50 thereby serving to positively lock plug 36 in yoke bore 34.

A slight chamfer is provided on shoulder outer wall 54 to allow shoulder 42 to be cammed into bore groove 48 when alignment occurs between shoulder 42 and bore groove 48. If desired, outer wall 54 may be constructed parallel to mating inner groove wall 50 so that when locked in place they will be flush.

While the present invention is disclosed in combination with slip spline assemblies that is designed for periodic replenishing of lubricant, it may also be used in assemblies that are lubricated for life. In such assemblies, bleed opening 41 (see FIGS. 2 and 3) would be eliminated and a boot type seal would be employed in place of seal 28 and retainer 30. In typical applications of this type, one of the spline teeth is removed to prevent pressure build-up and facilitate back and forth flow of lubricant during stroking.

Also, the flexibility of locking portions 46 may be reduced by reducing the number of notches 44 which extend from the end of plug side wall 40 or increased by increasing the number of notches.

Sealing plug 36 may be a stamped metal part which is finished machined or, alternatively, a one piece molded part made from a suitable plastic material such as nylon or a nylon/glass filled combination.

From the foregoing description it is apparent that the advantages of the present invention result from the combined relationship of the flexible locking portions of the sealing plug and its cooperation with the annular locking groove in the yoke bore. The arrangement provides a positive and economical way of retaining a sealing plug in the splined bore of a slip spline assembly that eliminates the need for providing additional welds, staking, or the use of a special bonding cement to secure the plug in place at assembly.

Having thus described the preferred embodiment of the present invention, it should be understood that the invention is not to be limited to the specific construction and arrangement shown. It will be apparent to those skilled in the art that modifications or alterations may be made without departing from the spirit and scope of the present invention as set forth in the claims.

What is claimed is:

1. In a slip spline assembly comprising; a yoke having a splined bore, said bore having first and second opposed open ends, the improvement comprising:
   a groove in one of said yoke bore ends,
   a plug for closing said one of said yoke bore ends, said plug comprising a closed end, a side wall integrally connected to said closed end, said side wall having a free end, a flexible portion integrally connected to said side wall free end having a radially outwardly extending shoulder engaging said yoke bore groove for positively locking said plug in said yoke bore.

2. In a slip spline assembly comprising; a yoke having a splined bore, said bore having first and second opposed open ends, a shaft extending into said first yoke bore end, said shaft having splines slidably engaging said yoke splined bore, the improvement comprising:
   a groove in said second yoke bore end,
   a cup-shaped plug for closing said one of said yoke bore ends, said plug comprising a closed flat end wall, an axially extending cylindrical side wall having one end integrally connected to said end wall and an axially spaced free end, a flexible portion integrally connected to said side wall free end having a radially outwardly extending shoulder engaging said yoke bore groove for positively locking said plug in said yoke bore.

3. The improvement as defined in claims 1 or 2 wherein said flexible portion comprises at least one axially extending tab section, said radially extending shoulder is integrally connected to said tab section, whereby said shoulder initially radially compresses said tab section when said plug is inserted in said yoke bore and whereby said tab section subsequently snaps said shoulder into locking engagement with said yoke bore groove when said shoulder and groove are aligned.

4. The improvement as defined in claim 1, wherein said plug is a cup-shaped member, said cup-shaped member comprising a closed flat end wall and an integral axially extending cylindrical side wall.

5. The improvement as defined in claims 1 or 2 wherein said flexible portion comprises at least one tab section integrally connected to the free end of said side wall.

6. The improvement as defined in claim 5 wherein said tab section further comprises camming means for initially engaging said yoke bore when said plug is inserted therein.

7. The improvement as defined in claim 1 or 2 wherein said flexible portion comprises a plurality of axially extending circumferentially spaced arcuate tab sections.

8. The improvement as defined in claim 7 wherein said radially extending shoulder is integrally connected to at least one of said tab sections, whereby said shoulder will initially compress said one tab section when said plug is pressed into said yoke bore and whereby said tab section subsequently snaps said shoulder into locking engagement with said groove when said shoulder and groove become aligned.

9. The improvement as defined in claims 1 or 2 wherein said plug further comprises a vent opening.

10. The improvement as defined in claims 1 or 2 wherein said plug comprises a plastic material.

11. The improvement as defined in claim 10 wherein said plastic material further comprises a glass filled composition.

* * * * *

UNITED STATES PATENT OFFICE
CERTIFICATE OF CORRECTION

PATENT NO. : 4,475,737

DATED : October 9, 1984

INVENTOR(S) : Thomas J. Cook, Jr. and Jay W. Thorngurgh

It is certified that error appears in the above-identified patent and that said Letters Patent are hereby corrected as shown below:

On the abstract page, change the spelling of the second inventors name from "Jay W. Thorngurgh" to --Jay W. Thornburgh--.

Signed and Sealed this

Twenty-fourth Day of September 1985

[SEAL]

Attest:

*Attesting Officer*

DONALD J. QUIGG

Commissioner of Patents and Trademarks—Designate